United States Patent [19]

Yamamoto et al.

[11] Patent Number: 4,483,000
[45] Date of Patent: Nov. 13, 1984

[54] CIRCUIT FOR ELIMINATING SPURIOUS COMPONENTS RESULTING FROM BURST CONTROL IN A TDMA SYSTEM

[75] Inventors: Kazuhiro Yamamoto; Masaaki Atobe, both of Tokyo, Japan

[73] Assignee: Nippon Electric Co., Ltd., Tokyo, Japan

[21] Appl. No.: 338,598

[22] Filed: Jan. 11, 1982

[30] Foreign Application Priority Data

Jan. 12, 1981 [JP] Japan .................................. 56-3671
Jan. 12, 1981 [JP] Japan .................................. 56-3672

[51] Int. Cl.³ .............................................. H04J 3/16
[52] U.S. Cl. ...................................... 370/95; 370/104
[58] Field of Search ............... 370/104, 20, 32, 70, 370/72, 93, 103, 29, 26, 97, 6, 95; 375/39, 8, 67

[56] References Cited

U.S. PATENT DOCUMENTS

| 3,683,116 | 8/1972 | Dill | 370/104 |
| 3,777,269 | 12/1973 | Brady | 375/67 |
| 3,909,750 | 9/1975 | Brady | 375/67 |
| 4,384,364 | 5/1983 | Henning | 370/20 |

OTHER PUBLICATIONS

A. Jefferis et al., "Simplified TDMA system for International Applications", Int. Conf. on Dig. Sat. Comm., Oct. 1978, pp. 341-345.
C. Cuccia, "Phase Synchronization of Digitally Modulated Burst Carriers in TDMA Systems–A Technology Overview", IEEE MTT-S Inter. Microwave Symposium Digest 1979, Apr.–May 1979, pp. 519-521.
K. Kato et al., "Hardware Evaluation of PSK Modern through Non-Linear Satellite Channel", ICC 1980, Internat. Confer. on Comm., Jun. 1980, p. 36.5.1.
H. Claadwick et al., "Performance of a TDMA Burst Modern through a Dual Nonlinear Satellite Channel", 5th Internat. Conf. on Dig. Satellite Comm., Mar. 1981, pp. 63-67.
Sakamoto et al., "PCM-TDMA Satellite Communications Equipment", Fujitsu Sci. & Tech. Journal, Dec. 1974, p. 20.

*Primary Examiner*—Douglas W. Olms
*Assistant Examiner*—Wellington Chin
*Attorney, Agent, or Firm*—Laff, Whitesel, Conte & Saret

[57] ABSTRACT

In an electronic circuit comprising a modulator (35) and used in each substation of a TDMA system and responsive to a baseband data signal sequence for producing a burst in accordance with a first burst control pulse, spurious components resulting in the burst from the first burst control pulse are eliminated either by allowing the data sequence to pass through a low-pass filter (36) after switching (45) the sequence by the first burst control pulse or by filtering the first burst control pulse by a low-pass filter before switching a local oscillation signal by the first control pulse. An additional switching circuit may switch either a modulated signal supplied from the modulator or the local oscillation signal in response to a second burst control pulse that disappears after extinction of the first burst control pulse. Alternatively, a modifying circuit reverses polarities of a preceding and a following data signals immediately preceding and following the sequence, relative to a leading and a trailing end data signals of the sequence.

8 Claims, 21 Drawing Figures

CIRCUIT FOR ELIMINATING SPURIOUS COMPONENTS RESULTING FROM BURST CONTROL IN A TDMA SYSTEM

BACKGROUND OF THE INVENTION

This invention relates to an electronic circuit for use in a time division multiple access (often abbreviated to TDMA) system and, in particular, to an electronic circuit comprising a modulator.

As a time division multiple access system, proposal has been made of a multidirectional time-division multiplex radio communication system using a comparatively small quantity of communication channels. Such a communication system comprises a central station fixedly located at a predetermined terrestrial site and a plurality of substations geographically spaced on the earth from the central station, as will later be described with reference to one of about twenty fingers of the accompanying drawing.

The central station simultaneously transmits a TDMA signal to all of the substations with each channel allotted in the TDMA signal to each of the substations. Responsive to the TDMA signal, each substation derives information only from the channel allotted thereto.

On the other hand, each substation transmits information to the central station in the form of a burst through a channel allotted to the substation. The burst is subjected to modulation, such as quadrature amplitude modulation.

A linear modulator, such as a balanced modulator, is used in combination with a baseband filter in each substation to carry out modulation. This enables a radio frequency filter of a wide pass band to be connected to the modulator in each substation because undesired components are reduced as compared with a modulator of a switched type.

As will later be described with reference to another figure, the burst should be produced by switching a data signal sequence in accordance with a burst control pulse having steep leading and trailing edges. As a result, harmonic components resulting from the leading and trailing edges are included in the burst without being removed by the radio frequency filter. Such harmonic components fall in any other receiving frequency bands in the form of interference waves. Hence, the receiving frequency bands are subjected to interference due to the interference waves. The influence of interference undesiredly grows as desired signals are reduced in magnitude by fading.

SUMMARY OF THE INVENTION

It is an object of this invention to provide an electronic circuit comprising a modulator, which is capable of producing a burst substantially free from spurious components.

It is another object of this invention to provide an electronic circuit of the type described, which is capable of suppressing harmonic waves resulting from a burst control pulse.

It is another object of this invention to provide an electronic circuit of the type described, which is capable of avoiding any leakage of a carrier signal used in the modulator.

It is another object of this invention to provide an electronic circuit of the type described, which prevents the burst control pulse from being steeply varied at the leading and the trailing edges thereof.

An electronic circuit to which this invention is applicable is for use in a time division multiple access system and is responsive to a sequence of baseband data signals and a burst control pulse for producing a data burst in a radio frequency band during presence of the burst control pulse. The data burst carries the data signal sequence, and the burst control pulse includes a first spurious component. The circuit comprises a linear modulator responsive to a first signal in the baseband and a second signal in the radio frequency band for linearly modulating the second signal by the first signal to produce, as the data burst, a modulated signal in the radio frequency band which carries the first signal, filter means responsive to a third signal in the baseband which includes the data signal sequence and a second spurious component for filtering the third signal to derive the first signal exempted from the second spurious component, generating means for generating a local oscillation signal in the radio frequency band, and signal supply means for supplying the modulator with the local oscillation signal as the second signal. According to this invention, a circuit comprises switching means responsive to the data signal sequence and the burst control pulse for switching the data signal sequence in accordance with the burst control pulse to supply the filter means with the third signal.

DESCRIPTION OF THE PREFERRED EMBODIMENTS

Figure 1:
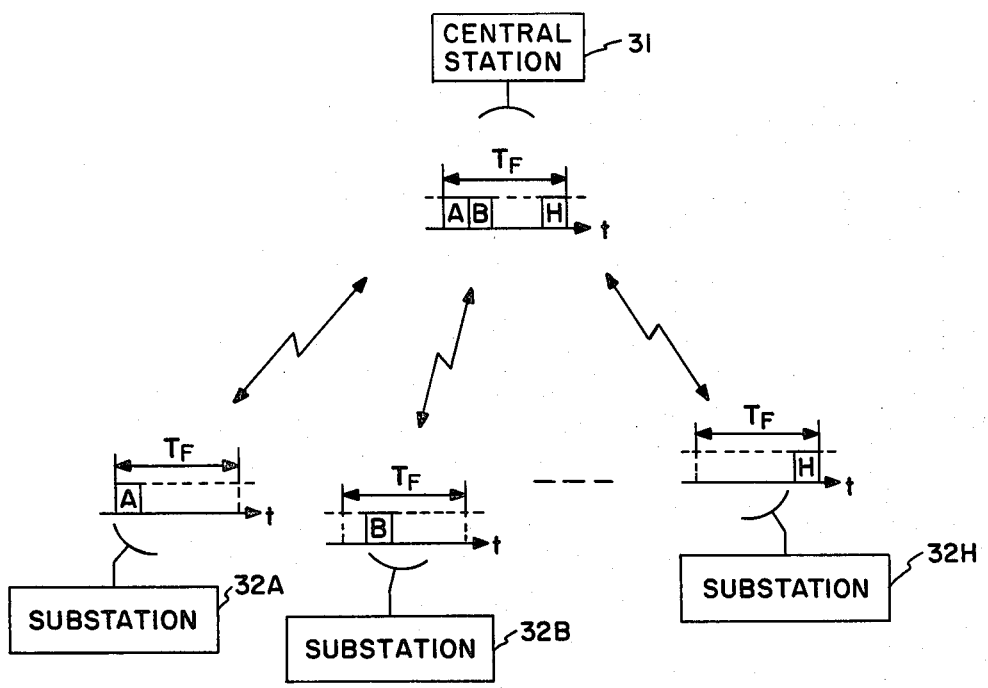
FIG. 1 shows a block diagram of a time division multiple access system comprising a central station and a plurality of substations to which this invention is applicable.

Referring to FIG. 1, a time division multiple access system to which this invention is applicable, will be described at first for a better understanding of this invention. In FIG. 1, the system may be considered as a multidirectional time-division multiplex radio communication system for carrying out communication by the use of a comparatively small number of communication channels. By way of example, the number of the communication channels used for telephone channels is equal to 24, 48, 96, or the like, in a frequency band between 1.8 and 2.3 GHz. Thus, the communication system has a small capacity of transmission as compared with a satellite communication system.

The small capacity communication system comprises a central station 31 fixed at a predetermined location and a plurality of substations 32A, 32B, . . . and 32H geographically spaced from the central station 31. A down link sequence of time-division multiple access (TDMA) signals is simultaneously sent from the central station 31 in a plurality of directions.

A plurality of down link data are arranged in time slots or channels A, B, . . . , H of the down link sequence which are allotted to the respective substations 32A, 32B, . . . , 32H in each frame period $T_F$. The substations 32A, 32B, . . . , 32H derive the down link data from the allotted time slots A, B, . . . , H, respectively.

Operated in synchronism with the central station 31, the substations 32 (suffixes omitted) produce up link bursts in time slots A, B, . . . , H allotted to the respective substations 32. The respective up link bursts are received in an arranged form by the central station 31 as an up link sequence of TDMA signals. Specifically, the up bursts are arranged in the up sequence in a predetermined order with respect to time. The central station 31 derives each of the up bursts from the up sequence and reproduces or demodulates each up burst.

In general, each of up and down link signals is subjected to quadrature amplitude modulation, for example, four-phase phase modulation. For this purpose, the central station and the substations comprise quadrature amplitude modulators, respectively.

Figure 2:
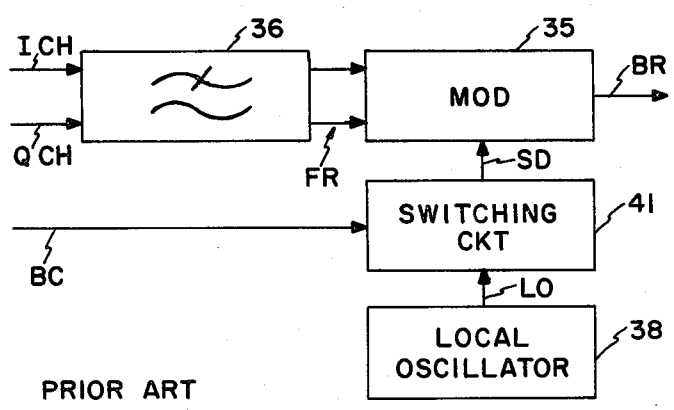
FIG. 2 shows a block diagram of a conventional electronic circuit.

Referring to FIG. 2, a conventional electronic circuit is for use in each substation and comprises a linear modulator 35. In FIG. 2, the linear modulator 35 serves to avoid any distortion of waveforms which would otherwise result from degradation of an amplitude versus time delay characteristic. The linear modulator 35 is specifically a quadrature amplitude modulator and is coupled on its output side to a band-pass filter (not shown) of a radio frequency band. Such a band-pass filter has a pass bandwidth enough to separate the down and the up sequences in frequency. Hence, the band pass filter may have a comparatively wide passband in consideration of a linear characteristic of the modulator 35.

Briefly, the electronic circuit is supplied with a sequence of baseband data signals and a burst control pulse BC from a transmitter logic circuit (not shown in FIG. 2) to produce a burst BR in the radio frequency band during presence of the burst control pulse BC in a manner described with reference to FIG. 1. In preparation for the quadrature amplitude modulation, the data signal sequence comprises first and second data signal series (depicted at ICH and QCH) to be located in an in-phase channel and a quadrature channel, respectively. The first and the second data signal series may be called in-phase channel and quadrature channel data signals, respectively. The burst control pulse BC has leading and trailing edges synchronized with the data signal sequence. The burst is subjected to the quadrature amplitude modulation and controlled by the burst control pulse BC. As a result, the burst carries the data signal sequence in a quadrature modulated manner.

More particularly, the electronic circuit comprises a low-pass filter 36 responsive to the data signal sequence for restricting a bandwidth of the data signals to the baseband and thereby for removing first harmonic or spurious components accompanying the data signals. In practice, a pair of low-pass filter circuits are used for the first and the second data signals ICH and QCH in the low-pass filter 36 represented by a single block. However, this will never become a bar to an understanding of this invention.

At any rate, the data signal sequence is sent through the low-pass filter 36 to the linear modulator 35 as a first signal FR.

The electronic circuit further comprises a local oscillator 38 for generating a local oscillation signal LO of a local frequency in the radio frequency band. The local oscillation signal LO is supplied to a switching circuit 41 together with the burst control pulse BC. The switching circuit 41 becomes active during presence of the burst control pulse BC and delivers the local oscillation signal LO as a second or carrier signal SD to the linear modulator 35 only during presence of the burst control pulse BC. Thus, the switching circuit 41 is used to switch or gate the local oscillation signal LO in the radio frequency band in accordance with the burst control pulse BC. The switching circuit 41 may, therefore, be called a radio frequency switching circuit.

Responsive to the first and the second signals FR and SD, the linear modulator 35 quadrature amplitude modulates the second signal SD by the first signal FR to send a quadrature amplitude modulated signal as the burst BR to the band-pass filter described before.

Herein, it should be noted here that the burst control pulse BC is inevitably accompanied by first spurious or harmonic components result from steep variations at the leading and the trailing edges of the burst control pulse BC and that the linear modulator 35 is turned on or off in accordance with the burst control pulse BC. Accordingly, any spurious components leak from the linear modulator 35 and are sent to the band-pass filter together with the modulated signals as the burst BR. Inasmuch as the band-pass filter has the wide pass band as described before, it passes through not only the burst but also the spurious components. As a result, the spurious components adversely affect any other receiving frequency band adjacent to that of the radio frequency, as described in the preamble of the instant specification.

It may be considered to use a narrow-band filter in lieu of the wide-band filter. However, it is difficult to design such a narrow-band filter because a very high unloaded Q factor is required to realize such a narrow-band filter.

Figure 3:
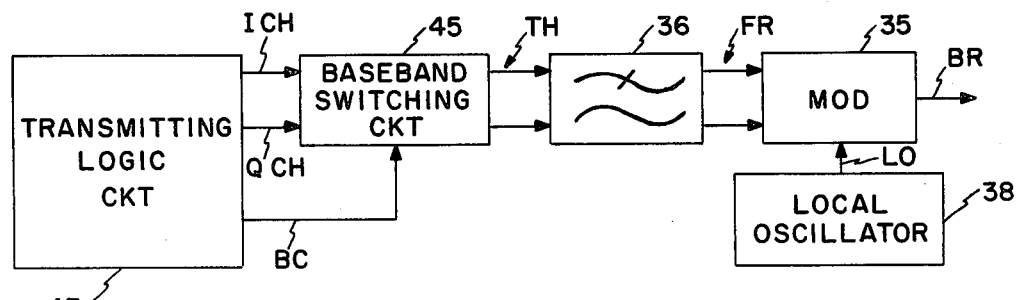
FIG. 3 shows a block diagram of an electronic circuit according to a first embodiment of this invention.

In FIG. 3, the electronic circuit comprises a switching circuit 45 between the logic circuit 43 and the low-pass filter 36 without the radio frequency switching circuit 41 illustrated with reference to FIG. 2. The switching circuit 45 switches the data signal sequence of the baseband in accordance with the burst control pulse BC. Therefore, the switching circuit 45 may be called a baseband switching circuit and will be so referred to hereinafter. Actually, the baseband switching circuit 45 comprises a pair of switches, as described in conjunction with the low-pass filter 36 illustrated in FIG. 2. At any rate, the data signal sequence of the baseband passes through the baseband switching circuit 45 only during presence of the burst control pulse BC.

Inasmuch as the burst control pulse BC includes the first spurious or harmonic components at the leading and the trailing edges thereof as described before, the baseband switching circuit 45 produces the data signal sequence together with second spurious or harmonic components. It is mentioned here that the data signals ICH and QCH include harmonic or undesired components. The second spurious components result from the harmonic components of both of the data signals and the burst control pulse BC. For convenience of description, a combination of the data signal sequence and the second spurious components from the switching circuit 45 will be referred to as a third signal TH hereinafter.

The third signal TH is supplied from the baseband switching circuit 45 to the low-pass filter 36. The low-pass filter 36 eliminates the second spurious components from the third signal TH to send the modulator 35 the first signal FR substantially free from the second spurious components. Inasmuch as the balanced or linear modulator 35 is directly supplied with the local oscillation signal LO as the second signal from the local oscillator 38, the local oscillation signal LO is subjected to the quadrature amplitude modulation by the first signal FR during presence of the burst control pulse BC. As a result, the linear modulator 35 produces the burst BR including no spurious components. In addition, any local oscillation signal LO hardly leaks from the linear modulator 35 during absence of the first signal FR.

Figure 4:
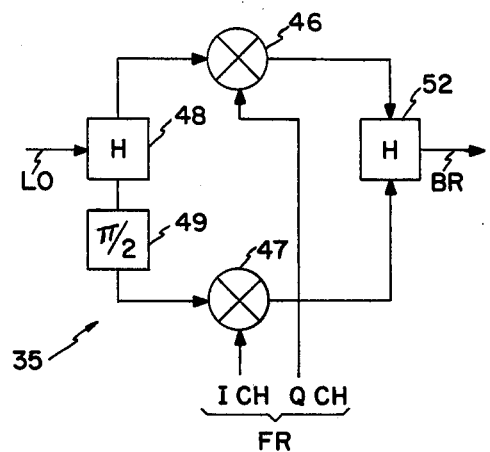
FIG. 4 shows a block diagram of a modulator used in the electronic circuit illustrated in FIG. 3.

Referring to FIG. 4, the linear modulator 35 illustrated in FIG. 3 comprises first and second phase modulators 46 and 47 for phase modulation of the first signal FR. The first signal FR comprises the in-phase and the quadrature channel data signals ICH and QCH controlled by the burst control signal BC. Each of the first and the second phase modulators 46 and 47 may be a balanced modulator, such as a ring modulator. The first phase modulator 46 is supplied with the local oscillation signal LO through a hybrid circuit 48 while the second phase modulator 47 is given the local oscillation signal LO through the hybrid circuit 48 and a $\pi/2$ phase shifter 49.

In any event, phase modulated signals are supplied from the first and the second phase modulators 46 and 47 to a second hybrid circuit 52 and sent as the burst BR to the central station 31 illustrated in FIG. 1 through the band-pass filter.

Herein, the phase modulated signals are exempted from the first spurious components included in the burst control pulse BC because the first signal FR is fed through the low-pass filter circuit 36 to the respective phase modulators 46 and 47.

Furthermore, each of the balanced modulators used as the first and second phase modulators 46 and 47 provides a linear relationship between a baseband signal and a modulated output signal. Therefore, any undesired components hardly appear in the burst even when the first signal FR and the local oscillation signal LO include spurious components. In addition, the local oscillation signal LO per se never leaks from the balanced modulators as the undesired components as long as the modulators are desirably operated.

It is well known in the art that the illustrated linear modulator 35 is operable as a quadrature amplitude modulator.

Figure 5:
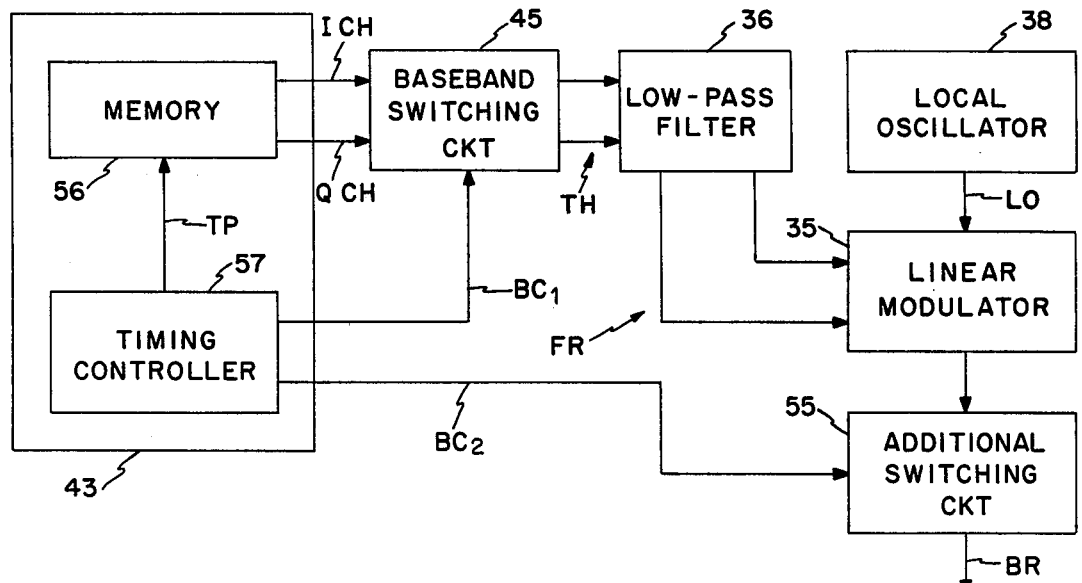
FIG. 5 shows a block diagram of an electronic circuit according to a second embodiment of this invention.

Referring to FIG. 5, an electronic circuit according to a second embodiment of this invention is similar to that illustrated with reference to FIG. 3 except that the linear modulator 35 is coupled to an additional switching circuit 55 and that the transmitting logic circuit 43 is shown to comprise a memory 56 and a timing controller 57. The timing controller 57 produces an additional burst control pulse in addition to the burst control pulse BC illustrated with reference to FIG. 3. For convenience of description, the burst control pulse and the additional burst control pulse are referred to as first and second burst control pulses, respectively, and will be indicated by $BC_1$ and $BC_2$, respectively, hereinafter. Furthermore, the timing controller 57 delivers a timing pulse TP to the memory 56 in synchronism with the first burst control pulse $BC_1$. Responsive to the timing pulse TP, the memory 56 successively transmits the data signal sequence to the baseband switching circuit 45.

Figure 6:
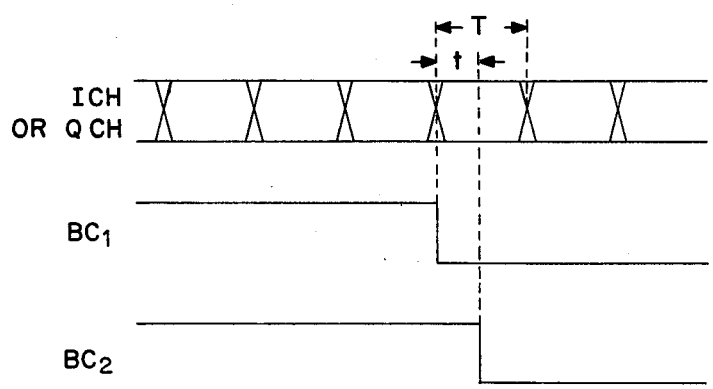
FIG. 6 shows a timing chart for describing operation of the electronic circuit illustrated in FIG. 5.

Referring to FIG. 6 together with FIG. 5, the first burst control pulse $BC_1$ is produced by the timing controller 57 so that the trailing edge of the first burst control pulse $BC_1$ is coincident with a code transition point of a predetermined one of the data signal (ICH or QCH). As a result, the data signal sequence is switched or gated by the first burst control pulse $BC_1$ to be supplied as the third signal TH to the low-pass filter 36. The second spurious components are removed from the third signal TH by the low-pass filter 36, in a manner described with reference to FIG. 3. Thus, the linear modulator 35 is supplied with the first signal FR without spurious components to produce the modulated signal subjected to quadrature amplitude modulation by the first signal FR.

It should be noted here that a balanced modulator used as the linear modulator 35 is not always ideally operated without any leakage of a carrier signal, namely, local oscillation signal LO. The additional switching circuit 55 serves to eliminate such leakage components or remanent components even when operation of the linear modulator 35 is incomplete with respect to suppression of the local oscillation signal component.

More specifically, the remanent component exhibits a waveform having a gentle slope at the trailing portion of the modulated signal because of the bandwidth restriction of the first signal FR. Taking the above into consideration, the second burst control pulse $BC_2$ disappears after the extinction of the first burst control pulse $BC_1$. The trailing edge of the illustrated second burst control pulse $BC_2$ is delayed by a predetermined duration t after the extinction of the first burst control pulse $BC_1$. The predetermined duration t may be equal to, for example, 0.5 T, 0.375 T, or the like, where T represents a single symbol period T. The leading edge of the second burst control pulse $BC_2$ is synchronized with that of the first burst control pulse $BC_1$.

The additional switching circuit 55 switches on or off the modulated signal in response to the second burst control pulse $BC_2$ to gate or interrupt the modulated signal. In other words, the additional switching circuit 55 is used in a radio frequency band, as is the case with the conventional electronic circuit illustrated with reference to FIG. 2.

However, the additional switching circuit 55 is more contributive to removal of the remanent components rather than production of any spurious components resulting from the second burst control pulse $BC_2$.

This is because the second burst control pulse $BC_2$ is turned off after the first burst control pulse $BC_1$ disappears. Specifically, the remanent component is reduced in its magnitude because of the bandwidth restriction of the first signal FR. Discontinuity of the remanent component is slight even when the remanent component is turned off. Therefore, any adverse influence hardly takes place due to the switching operation of the additional switching circuit 55.

Preferably, the second burst control pulse $BC_2$ disappears when an envelope of the modulated signal crosses a zero level.

Figure 7:
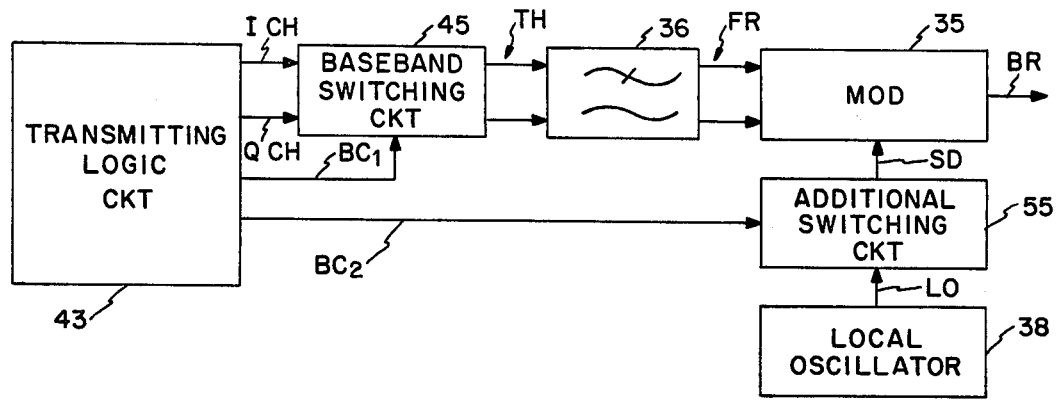
FIG. 7 shows a block diagram of an electronic circuit according to a third embodiment of this invention.

Referring to FIG. 7, an electronic circuit according to a third embodiment of this invention is similar to that illustrated with reference to FIG. 5 except that an additional switching circuit 55 is interposed between the local oscillator 38 and the linear modulator 35 and responsive to a second burst control pulse $BC_2$ similar to that illustrated with reference to FIG. 5 to switch the local oscillation signal LO. The second burst control pulse $BC_2$ is turned off after extinction of the first burst control pulse $BC_1$. The trailing edge of the second burst control pulse $BC_2$ is delayed by the predetermined duration of, for example, 0.375 T, relative to that of the first burst control pulse $BC_1$, where T is representative of the symbol period as described before. It is also possible for the electronic circuit to suppress any spurious components unexpectedly produced from the linear modulator 35.

Figure 8:
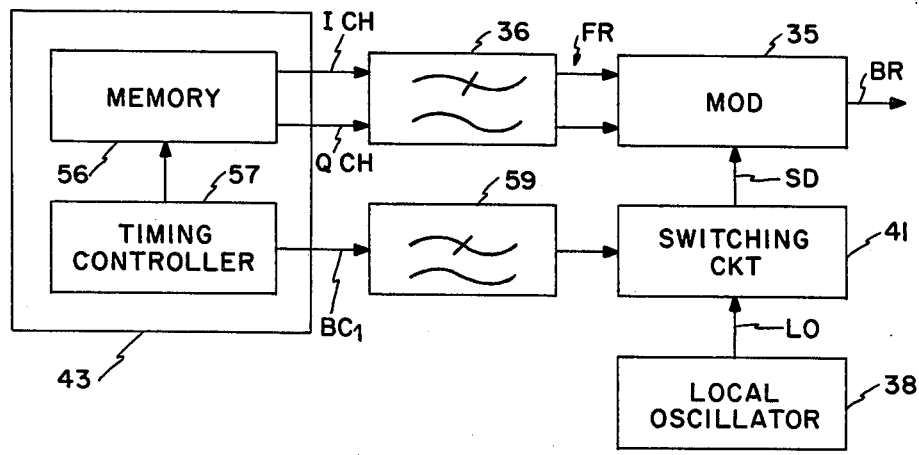
FIG. 8 shows a block diagram of an electronic circuit according to a fourth embodiment of this invention.

Referring to FIG. 8, an electronic circuit according to a fourth embodiment of this invention is similar to that illustrated with reference to FIG. 2 except that an additional low-pass filter 59 is interposed between the timing controller 57 and the radio frequency switching circuit 45. The baseband switching circuit 45 illustrated in FIG. 7 is removed from the electronic circuit being illustrated. The additional low-pass filter 59 is supplied with the first burst control pulse $BC_1$ as shown in FIG. 6 to eliminate the first spurious or harmonic components included in the first burst control pulse $BC_1$ and to produce a gating signal substantially exempted from the first spurious components. Responsive to the gating signal, the radio frequency switching circuit 41 passes the local oscillation signal LO therethrough as the second signal SD which is substantially free from any undesired components resulting from the first spurious components. The second signal SD is supplied to the linear modulator 35.

On the other hand, the first and the second data signals ICH and QCH are delivered in the form of the data signal sequence through the low-pass filter 36 to the linear modulator 35 as the first signal FR without the second spurious components resulting from the data signals ICH and QCH.

Inasmuch as both of the first and the second signals FR and SD are exempted from any spurious or harmonic components, the modulator 35 produces the modulated signal as the burst BR without spurious components also.

If there is a threat of leakage of the local oscillation signal LO from the linear modulator 35, another switching circuit may be connected to the linear modulator 35 and controlled by the second burst control pulse $BC_2$, as is the case with the circuit illustrated in FIG. 5.

Figure 9:
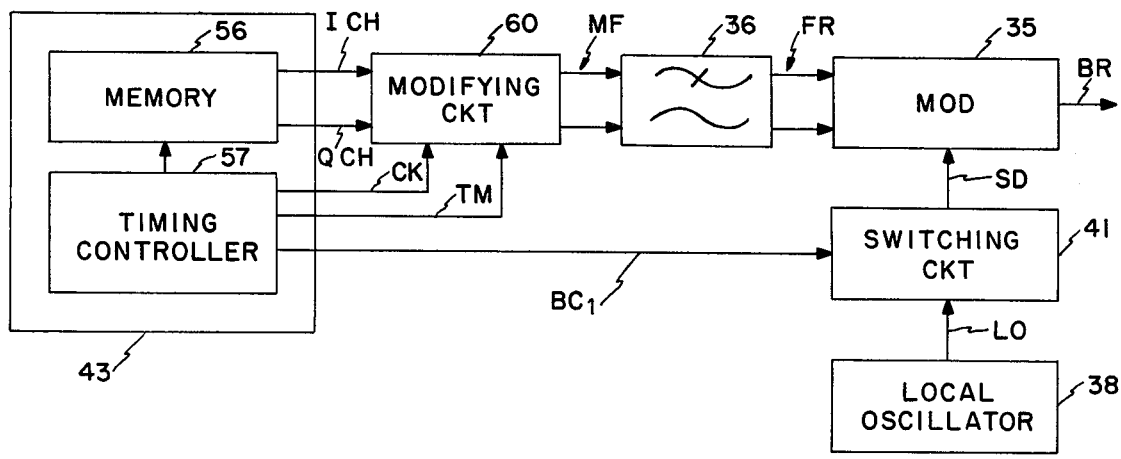
FIG. 9 shows a block diagram of an electronic circuit according to a fifth embodiment of this invention.

Referring to FIG. 9, an electronic circuit according to a fifth embodiment of this invention is for use in combination with the electronic circuit illustrated in FIG. 2 and further comprises a modifying circuit 60 between the transmitting logic circuit 43 and the low-pass filter 36. The modifying circuit 60 is supplied with the data signal sequence as the first and the second data signals ICH and QCH to modify the data signal sequence into a modified signal MF in a manner to be described later. Supplied with the modified signal MF as an input data signal, the low-pass filter 36 produces a filtered data signal by filtering the input data signal. The filtered data signal is sent to the linear modulator 35 as the first signal FR which is substantially free from the second spurious components resulting from the data signal sequence.

The radio frequency switching circuit 41 switches the local oscillation signal LO in accordance with the first burst control pulse $BC_1$ to produce a second signal SD. Spurious components may be included in the second signal SD, as is the case with the second signal SD illustrated with reference to FIG. 2. These spurious components result from the first spurious components in the first burst control pulse $BC_1$.

In spite of supply of such a second signal SD, the linear modulator 35 is capable of suppressing any spurious components by the use of the modifying circuit 60.

Figure 10:
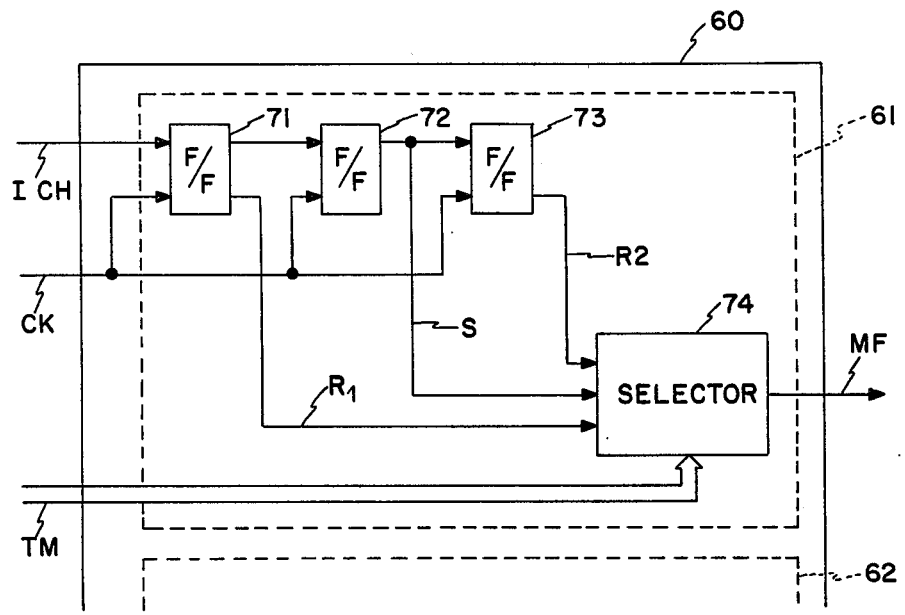
FIG. 10 shows a block diagram of a modification circuit used in the electronic circuit illustrated in FIG. 9.

Referring to FIG. 9 again and FIG. 10 afresh, the modifying circuit 60 is supplied with a clock pulse sequence CK and a timing control signal TM comprising two bits in parallel at a time, in addition to the data signal sequence. As shown in FIG. 9, the clock pulse sequence CK and the timing control signal TM are delivered from the timing controller 57 to the modifying circuit 60 while the data signal sequence, from the memory 56 to the modifying circuit 60.

In FIG. 10, the modifying circuit 60 comprises first and second portions 61 and 62 for modifying the first and the second data signals ICH and QCH in a manner to be presently described, respectively. The second portion 62 is similar in structure to the first portion 61 and, therefore, omitted from this FIGURE for simplicity of illustration.

The first portion 61 comprises a shift register having first, second, and third flip flops 71, 72, and 73 and a selector 74 connected to the first through third flip flops 71 to 73. More particularly, the first through third flip flops 71 to 73 supply the selector 74 with a first reset signal $R_1$, a set signal S, and a second reset signal $R_2$, respectively. Furthermore, the selector 74 is given the timing control signal TM of two bits synchronized with each of the clock pulses CK. Herein, it is assumed that the first and the second reset signals $R_1$ and $R_2$ are selected by the selector 74 when the two bits of the timing control signal TM are representative of "11" and "00", respectively, and that the set signal S is otherwise selected by the selector 74.

The first or in phase data signals ICH are supplied to the first flip flop 71 in synchronism with one of the clock pulses CK and successively shifted into the second flip flop 72 and, thereafter, into the third flip flop 73 in accordance with the clock pulse sequence CK.

Figure 11:
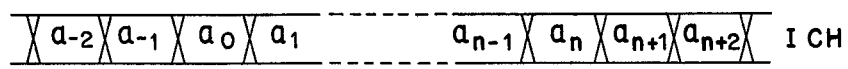
FIG. 11 shows a timing chart for describing operation of the modification circuit.
Figure 11:
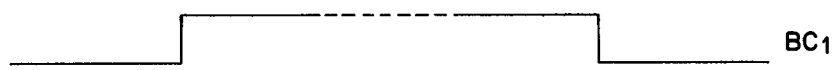
Figure 11:

Referring to FIG. 10 again and FIG. 11 afresh, the first data signal sequence ICH comprises a true data signal sequence $a_O, a_1, \ldots, a_n$ to be transmitted through a predetermined channel assigned to the substation in question and the preceding and the following data sequences located before and after the true data signal sequence, respectively. The true data signal sequence includes a leading or first data signal $a_O$ and a trailing or last data signal $a_n$. The preceding and the following data sequences serve as scramble signals rather than information signals and include the preceding data signal $a_{-1}$ and the following data signal $a_{n+1}$ immediately before and after the first and the last data signals $a_O$ and $a_n$, respectively.

The first portion 61 illustrated in FIG. 10 is operated to reverse the preceding and the following data signals $a_{-1}$ and $a_{n+1}$ in polarity relative to the first and the last data signals $a_O$ and $a_n$, respectively. More particularly, the true data signal sequence is produced during presence of a first burst control pulse depicted at $BC_1$ in FIG. 11, as is the case with the first burst control pulse $BC_1$ set forth with reference to FIG. 3. This means that the timing controller 57 monitors the true data signal sequence. In addition, the timing controller 37 delivers the clock pulse sequence CK and the timing control signal TM in timed relation to the data signal sequence ICH.

Turning back to FIG. 10, the preceding data sequence is successively kept in the first through third flip flops 71 through 73. Under the circumstances, the selector 74 is supplied as the timing control signal TM with the two bits of "10" or "01" to select the set signal S. When the preceding data signal $a_{-1}$ is shifted from the first flip flop 71 into the second flip flop 72 with the first data signal $a_O$ kept in the first flip flop 71, the timing controller 57 supplies the selector 74 with two bits of "11" as the timing control signal TM. As a result, the first reset signal $R_1$ is selected by the selector 74 to produce a data signal "$\bar{a}_O$" as the modified signal MF during a time slot assigned to the preceding data signal $a_{-1}$. This means that the preceding data signal $a_{-1}$, namely, $\bar{a}_O$ is reversed in polarity relative to the first data signal $a_O$, as shown at MF in FIG. 11.

When the first data signal $a_O$ is shifted into the second flip flop 72, the timing controller 57 supplies the selector 74 with the timing control signal TM of "10". Accordingly, the set signal S is selected by the selector 74 to be produced as the modified signal MF.

When the last data signal $a_n$ is kept in the third flip flop 73 with the following data signal $a_{n+1}$ held in the second flip flop 72, the selector 74 is given the timing control signal TM of "00" from the timing controller 57 to select the second reset signal $R_2$. From this fact, it is readily understood that a data signal of "$\bar{a}_n$" is produced as the modified signal MF during a time slot allotted to the following data signal $a_{n+1}$, as illustrated at MF in FIG. 11. Thus, the following data signal is reversed in polarity relative to the last data signal $a_n$.

Turning back to FIG. 9, the first and the last data signals $a_O$ and $a_n$ are sent through the low-pass filter 36 to the linear modulator 35 together with the preceding and the following data signals reversed in polarities relative to the first and the last data signals $a_O$ and $a_n$, respectively. The modulator 35 is supplied with the local oscillation signal LO switched by the radio frequency band switch 41 in accordance with the first burst control pulse $BC_1$. Inasmuch as the leading and the trailing edges of the first burst control pulse $BC_1$ are coincident with the first and the last data signals $a_O$ and $a_n$, respectively, the modulated signal produced as the burst BR has a phase variation of $\pi$ radians between the preceding and the first data signals or between the last and the following data signals.

This means that the envelope of the modulated signal comes near to a zero level at each of the leading and the trailing edges of the modulated signal. In other words, a reduction is possible of electric power consumed at the leading and the trailing portions of the modulated signal and is also possible of discontinuity of a waveform at the leading and the trailing edges. Therefore, it is possible with this electronic circuit to suppress any spurious or harmonic components.

Figure 12:
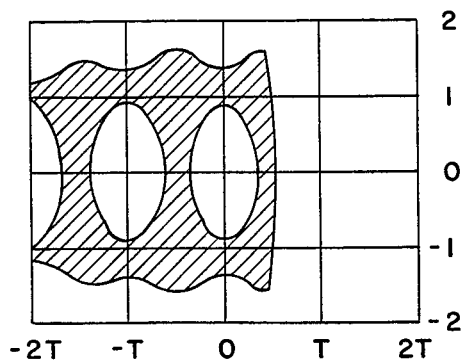
FIG. 12 shows a time versus amplitude simulation characteristic of the conventional electronic circuit illustrated in FIG. 2.
Figure 13:
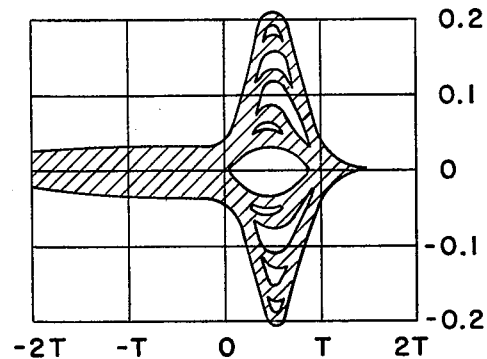
FIG. 13 shows a characteristic of interference waves measured at other receiving frequency band when the conventional circuit is simulated.
Figure 21:
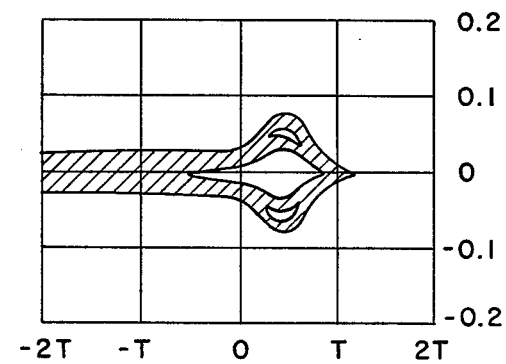
FIG. 21 shows a characteristic similar to those of FIGS. 13, 15, 17, and 19 and obtained when simulation is made of electronic circuit illustrated in FIG. 20.

Referring generally to FIGS. 12, 13, ..., and FIG. 21, wherein the abscissa and the ordinate represent time and an amplitude (volt), respectively, description will be made of characteristics of the electronic circuits according to the first, third, fourth, and fifth embodiments of this invention in comparison with those of the conventional electronic circuit illustrated in FIG. 2. The characteristics in an even-numbered group of these FIGURES are specified by output waveforms of the bursts supplied from the conventional circuit and the electronic circuits according to the above-mentioned embodiments of this invention while those in an odd-numbered group of figures, input waveforms of interference waves. Each of the interference waves is derived from a receiving filter operable at a frequency band spaced in frequency by twice a Baud rate.

Herein, as the receiving filter, simulation was made of a combination of a Gaussian filter and a cut-off filter which are equal to 1 and 2 in terms of so called BT products, respectively, where B represents a 3 dB bandwidth and T, a clock period of the clock pulse CK.

On the other hand, the low-pass filter 36 in each of the electronic circuits was constituted by a roll-off filter which had a roll-off factor of 50% and which is obtained by modifying the receiving filter. In this simulation, the delay time of each electronic circuit was neglected for easy understanding of this invention.

Referring more particularly to FIGS. 12 and 13, the conventional electronic circuit illustrated in FIG. 2 rapidly turns off the burst at a time point of T/2, as shown in FIG. 12. As a result, considerably high spurious components, namely, interference waves appear at the adjacent frequency band spaced from the radio frequency, as in FIG. 13. It has been confirmed that the desired-to-undesired signal ratio is reduced to 13 dB.

Figure 14:
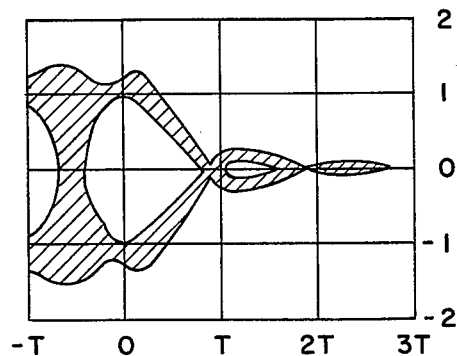
FIG. 14 shows a similar characteristic of the electronic circuit illustrated in FIG. 3.
Figure 15:
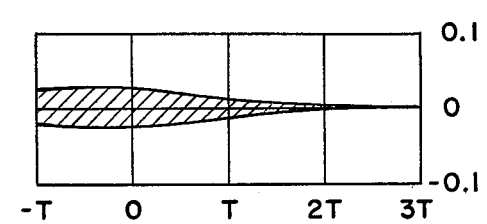
FIG. 15 shows a similar characteristic of interference waves measured at the same condition when the electronic circuit illustrated in FIG. 3 is simulated.

Referring to FIGS. 14 and 15, the electronic circuit illustrated in FIG. 3, switches off the burst at a time point of T/2, like in FIG. 12. In FIG. 14, the amplitude of the burst is gradually lowered between 0 and T because of a reduction of spurious components. As clearly shown in FIG. 15, interference waves resulting from such switching are remarkably decreased in amplitude.

Figure 16:
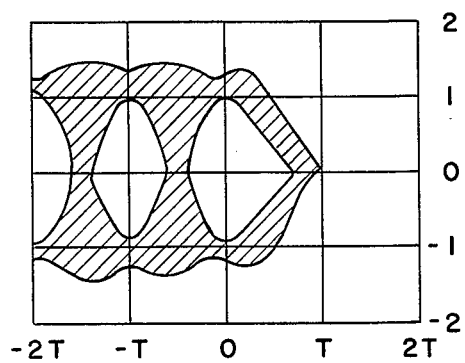
FIG. 16 shows a characteristic of the electronic circuit illustrated in FIG. 7.
Figure 17:
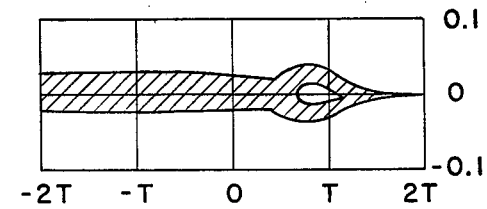
FIG. 17 shows a characteristic similar to those of FIGS. 13 and 15 and obtained when simulation is made of the electronic circuit illustrated in FIG. 7.

Referring to FIGS. 16 and 17, the electronic circuit illustrated in FIG. 7 switches off the burst with the amplitude of the burst gradually reduced between 0 and T, as is the case with FIG. 14. No leakage of spurious components takes place after the time point T any more.

From FIG. 17, it is understood that the interference waves scarcely take place on switching the burst. In addition, the trailing edge of the second burst control pulse $BC_2$ was delayed by 0.375 T after the trailing edge of the first burst control pulse $BC_1$.

Figure 18:
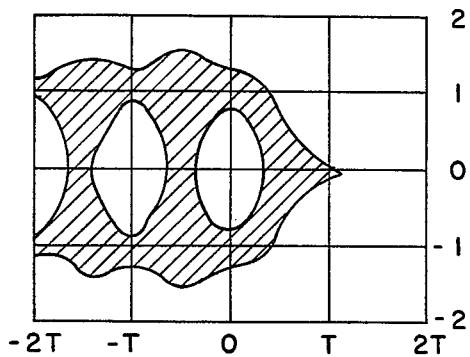
FIG. 18 shows a characteristic of the electronic circuit illustrated in FIG. 8.
Figure 19:
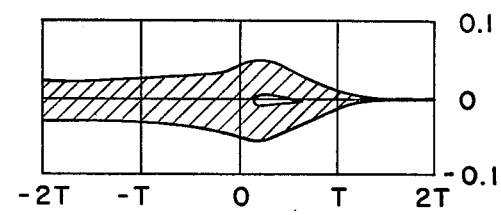
FIG. 19 shows a characteristic similar to those of FIGS. 13, 15 and 17 and obtained when simulation is made of the electronic circuit illustrated in FIG. 18.

Referring to FIGS. 18 and 19, the electronic circuit illustrated in FIG. 8 rarely introduces the interference waves into the adjacent frequency band, as is the case with FIG. 15. As the additional filter 61 illustrated in FIG. 8, use was made of a filter having a BT product equal to unity.

Figure 20:
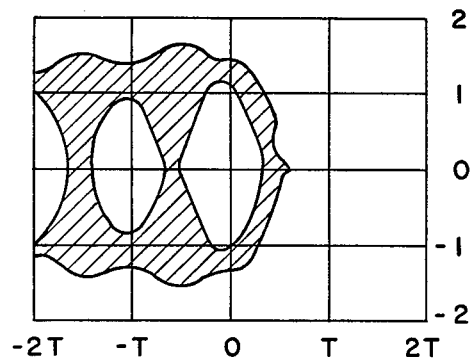
FIG. 20 shows a characteristic of the electronic circuit illustrated in FIG. 9.

Finally referring to FIGS. 20 and 21, the electronic circuit illustrated with reference to FIGS. 9 through 11 are similar in its characteristic to the electronic circuits shown in FIGS. 7 and 8. Thus, it is possible to reduce the interference waves by reversing the preceding and the following data signals in polarity relative to the first and the last data signals of the data signal sequence.

At any rate, it has been confirmed with the electronic circuits according to this invention that the worst desired-to-undesired ratio becomes more than 26 dB. Therefore, improvement more than about 13 dB is accomplished with respect to the worst desired-to-undesired ratio with the electronic circuits according to this invention.

While this invention has thus far been described in conjunction with several embodiments thereof, it is readily possible for those skilled in the art to practice this invention in various manners. For example, any modulation other than the quadrature amplitude modulation may be carried out in the electronic circuit. The modifying circuit illustrated in FIG. 9 may be combined with the electronic circuit illustrated in FIG. 8. The modulator 35 of FIG. 9 may produce the burst BR through an additional switching circuit 55 as illustrated in FIG. 5. In FIG. 9, the switching circuit 41 may be coupled in the rear of the modulator 35 to switch the burst BR.

What is claimed is:

1. An electronic circuit for use in a time division multiple access system and responsive to a sequence of baseband data signals and a burst control pulse for producing a data burst in a radio frequency band during presence of said burst control pulse, said data burst carrying said data signal sequence, said burst control pulse including a first spurious component, said circuit comprising a linear modulator responsive to a first signal in the baseband and a second signal in the radio frequency band for linearly modulating said second signal by said first signal to produce, as said data burst, a modulated signal, filter means responsive to a third signal in the baseband which includes said data signal sequence and a second spurious component for filtering said third signal to derive said first signal exempted from said second spurious component, generating means for generating a local oscillation signal in the radio frequency band, and signal supply means for supplying said modulator with said local oscillation signal as said second signal, said circuit further comprising:
    switching means responsive to said data signal sequence and said burst control pulse for switching said data signal sequence in accordance with said burst control pulse to supply said filter means with said third signal.

2. An electronic circuit as claimed in claim 1, wherein said signal supply means comprises connecting means for connecting said generating means to said modulator to directly supply said local oscillation signal to said modulator as said second signal.

3. An electronic circuit as claimed in claim 2, said circuit being supplied with an additional burst control pulse which disappears after extinction of said burst control pulse, said electronic circuit further comprising switching means coupled to said modulator for switching said modulated signal in accordance with said additional burst control pulse to produce a switched modulated signal as said data burst during presence of said additional burst control pulse and to interrupt said modulated signal after extinction of said burst control pulse.

4. An electronic circuit as claimed in claim 1, said circuit being supplied with an additional burst control pulse which disappears after extinction of said burst control pulse, said signal supply means comprising switch means coupled to said generating means and said modulator and responsive to said additional burst control pulse for switching said local oscillation signal in timed relation to said additional burst control pulse to supply said modulator with a switched local oscillation signal as said second signal during presence of said additional burst control pulse.

5. An electronic circuit for use in a time division multiple access system and responsive to a sequence of baseband data signals and a burst control pulse for producing a data burst in radio frequency band during presence of said burst control pulse, said data burst carrying said data signal sequence, said burst control pulse including a first spurious component, said data signal sequence including a second spurious component, said circuit comprising first filter means for filtering said data signal sequence to produce a filtered data signal sequence substantially free from said second spurious component, generating means for generating a local oscillation signal in said radio frequency band, signal gating means responsive to said local oscillation signal and a gating signal for gating said local oscillation signal in accordance with said gating signal to produce a gated local oscillation signal, and a linear modulator responsive to said filtered data signal sequence and said gated local oscillation signal for linearly modulating said gated local oscillation signal by said filtered data signal sequence to produce a modulated signal in said radio frequency band as said data burst, said circuit comprising:
    second filter means coupled to said signal gating means and responsive to said burst control pulse for filtering said burst control pulse to supply said signal gating means with said gating signal substantially exempted from said first spurious component.

6. An electronic circuit for use in a time division multiple system and responsive to a sequence of baseband data signals and a burst control pulse for producing a data burst of a radio frequency band during presence of said burst control pulse, said data burst carrying said data signal sequence, said burst control pulse and said data signal sequence including a first and a second spurious component, respectively, said circuit comprising filter means for filtering an input data signal related to said data signal sequence to produce a filtered data signal sequence substantially free from said second spurious component, generating means for generating a local oscillation signal in said radio frequency band, signal gating means responsive to said local oscillation signal and a gating signal for gating said local oscillation signal in accordance with said gating signal to produce a gated local oscillation signal, a linear modulator responsive to said filtered data signal sequence and said gated local oscillation signal for linearly modulating said gated local oscillation signal by said filtered data signal sequence to produce a modulated signal in said radio frequency band, burst producing means for producing said modulated signal as said data burst, said data signal sequence comprising a leading data signal and a trailing data signal and being accompanied by a preceding data signal immediately preceding said leading data signal and a following data signal immediately following said trailing data signal, each of said leading, said trailing, said preceding, and said following signals having a polarity assigned thereto, said circuit comprising:

modifying means responsive to the data signal sequence accompanied by said preceding and said following data signals for modifying at least one of said preceding and said following data signals into each modified signal so that the polarity of said each modified signal is changed relative to one of said leading and said trailing data signals that is immediately adjacent to said at least one of the preceding and the following signals; and means for supplying said modified signal as said input data signal to said filter means.

7. An electronic circuit as claimed in claim 6, said circuit being supplied with an additional burst control pulse which disappears after extinction of said burst control pulse, said burst producing means comprising switching means for switching said modulated signal in accordance with said additional burst control pulse to produce a switched and modulated signal as said data burst.

8. An electronic circuit for use in a time division multiple system and responsive to a sequence of baseband data signals and a burst control pulse for producing a data burst of a radio frequency band during a presence of said burst control pulse, said data burst carrying said data signal sequence, said data signal sequence including a spurious component, said circuit comprising filter means for filtering an input data signal related to said data signal sequence to produce a filtered data signal sequence generating means for generating a local oscillation signal in said radio frequency band, a linear modulator responsive to said filtered data signal sequence and said local oscillation signal for linearly modulating said local oscillation signal by said filtered data signal sequence to produce a modulated signal in said radio frequency band, and gating means responsive to said modulated signal and a gating signal for gating said modulated signal in accordance with said gating signal to produce said data burst, said data signal sequence comprising a leading data signal and a trailing data signal and being accompanied by a preceding data signal immediately preceding said leading data signal and a following data signal immediately following said trailing data signal, each of said leading, said trailing, said preceding, and said following signals having a polarity assigned thereto, said circuit comprising:

reducing means responsive to the data signal sequence accompanied by said preceding and said following data signals for reducing said spurious component by modifying at least one of said preceding and said following data signals into each modified signal so that the polarity of said each modified signal is changed relative to one of said leading and said trailing data signals that is immediately adjacent to said at least one of the preceding and the following signals; and means for supplying said modified signal as said input data signal to said filter means.

* * * * *